Feb. 15, 1966  H. J. DAWSON, JR  3,234,779
MULTIPLE COLUMN GAS CHROMATOGRAPHY
Filed Aug. 21, 1956  3 Sheets-Sheet 1

INVENTOR.
Harold J. Dawson, Jr.
BY Everett A. Johnson
ATTORNEY

Feb. 15, 1966     H. J. DAWSON, JR     3,234,779
MULTIPLE COLUMN GAS CHROMATOGRAPHY

Filed Aug. 21, 1956     3 Sheets-Sheet 2

INVENTOR.
Harold J. Dawson, Jr.
BY Everett A. Johnson
ATTORNEY

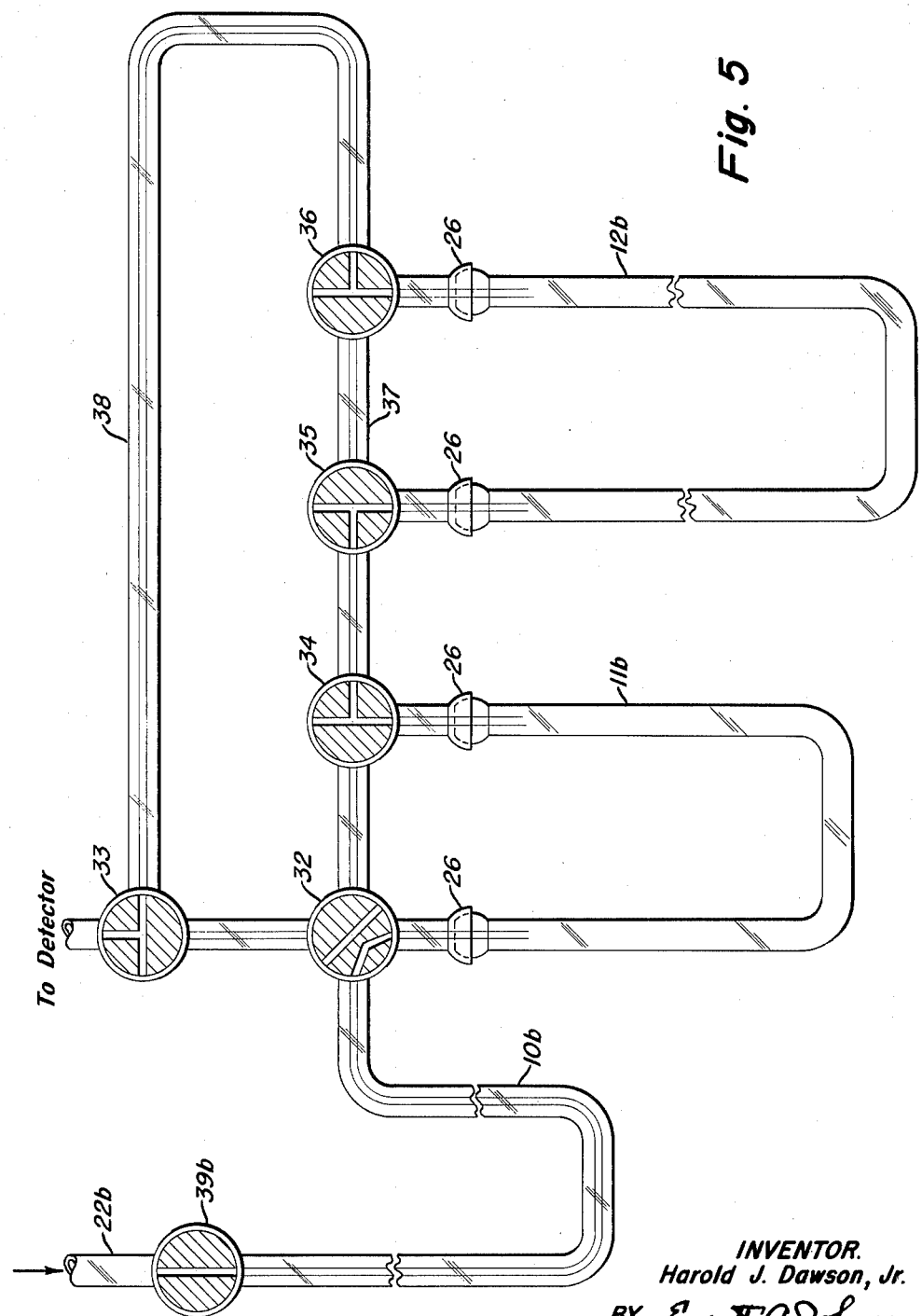

United States Patent Office 3,234,779
Patented Feb. 15, 1966

3,234,779
MULTIPLE COLUMN GAS CHROMATOGRAPHY
Harold J. Dawson, Jr., Hammond, Ind., assignor to Standard Oil Company, Chicago, Ill., a corporation of Indiana
Filed Aug. 21, 1956, Ser. No. 605,373
3 Claims. (Cl. 73—23.1)

This invention relates to apparatus for separation of complex mixtures and more particularly relates to gas chromatography.

Vapor-phase or gas chromatography is an analytical method that gives rapid, accurate analyses of complex mixtures of volatile materials in simple, inexpensive equipment. Separations take place in small columns packed with a specific type of packing selected to accomplish particular separations. Components of a sample are separated as they are carried through the column by an eluting gas and determined as they pass out of the column by a sensitive detector such as a thermal-conductivity cell. Vapor-phase chromatography is of two general types: adsorption, in which active adsorbents are used as column packing, and partition, in which the packing consists of a stationary liquid phase coating a finely-divided inert solid, such as Celite. In partition chromatography separation results from differences in vapor pressure of the components of a sample over the stationary liquid. Nitrogen, helium, hydrogen, and carbon dioxide are common eluting gases.

It is an important object of my invention to provide an apparatus which is capable of a wide range of operating conditions adapted to meet the needs of individual analyses. A further object of the invention is to provide a flexible apparatus which utilizes the advantage of both adsorption and partition chromatographic separations. Still another object of the invention is to provide a system which provides more rapid and more efficient separations of difficulty separated mixtures. These and other objects of the invention will become apparent as the description proceeds.

The present invention comprises an improved vapor-phase chromatography apparatus that provides quicker and better separations of mixtures that are difficult to separate.

Quantitative and rapid separation of all constituents in a mixture can be effected by using, for example, three columns, one partition and two adsorption, in series with separate bypass lines around each of the latter two for rapidly eluting constituents from each column after they have been distributed therein.

Two or more columns (partition and/or adsorption) are connected so that the eluting gas passing out of one column may either enter another column or the detector at the will of the operator or at preset times. Therefore, if two components are not separated in the first column, they can be passed unseparated into a second column that will separate them. The remainder of the components, being separated in the first column, bypass the second column, resulting in a quicker analysis, sharper peaks, and better separations. The second, third, etc., columns may be connected to other columns, a common detector, or to a separate detector used to determine only the components separated in that particular column. This entire apparatus can be made automatic with an automatic sampling system and quick-opening valves operated electrically with solenoids on a time schedule.

Further details and advantages of my system will be described by reference to the accompanying drawings wherein:

FIGURES 4 and 5 are schematic views of embodiments of the manifolds which may be used to implement the systems illustrated by FIGURES 1 and 2.

Figure 1:
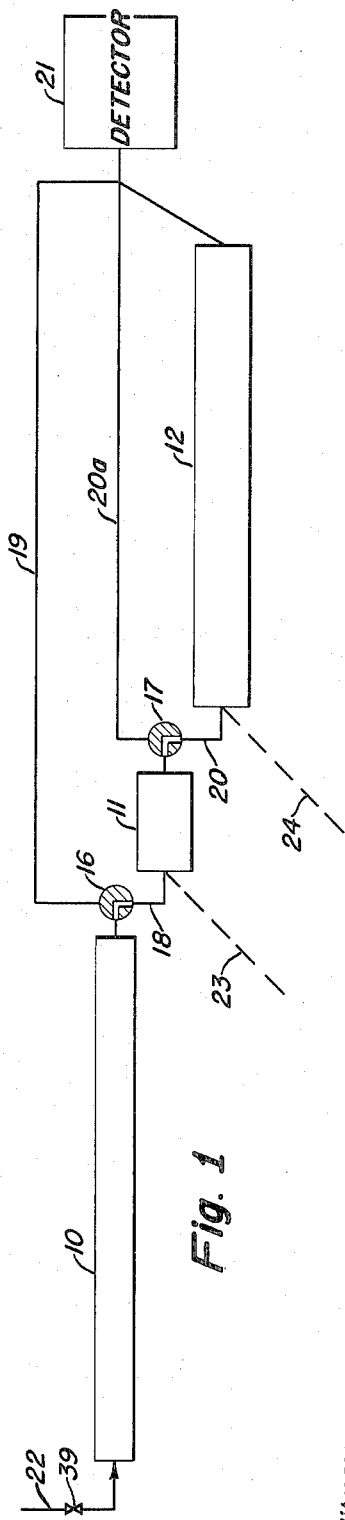
FIGURE 1 is a schematic view of my improved chromatography apparatus.

Referring to the drawing the improved apparatus consists of columns 10, 11 and 12 of different lengths and sizes packed with appropriate packings 13, 14 and 15 for obtaining specific separations. These columns are connected, for example, as shown in FIGURE 1, by valves 16 and 17 and short lengths of tubing 18, 19 and 20 so that the gas coming out of column 10 may be passed into column 11 or into the detector 21 and the gas from column 11 can go into column 12 or into the detector 21, as desired. The number of columns is not limited; U-shaped or bayonet columns are generally advised to permit using short transfer lines but other column forms may be used. Provision may also be made for separate eluting gas inlets 22, 23 and 24 to columns 10, 11 and 12. Provision may also be made for separate detectors (not shown) on the outlet side of any or all of the columns to speed up the analysis and in some cases to sharpen peaks of components which might diffuse together in partition column 10. By using an automatic sampling system and timing equipment (not shown) for opening and closing valves 16 and 17, etc. this entire unit can be put into a cycle for automatic analysis and used for process control or as an automatic analytical instrument.

Figure 2:
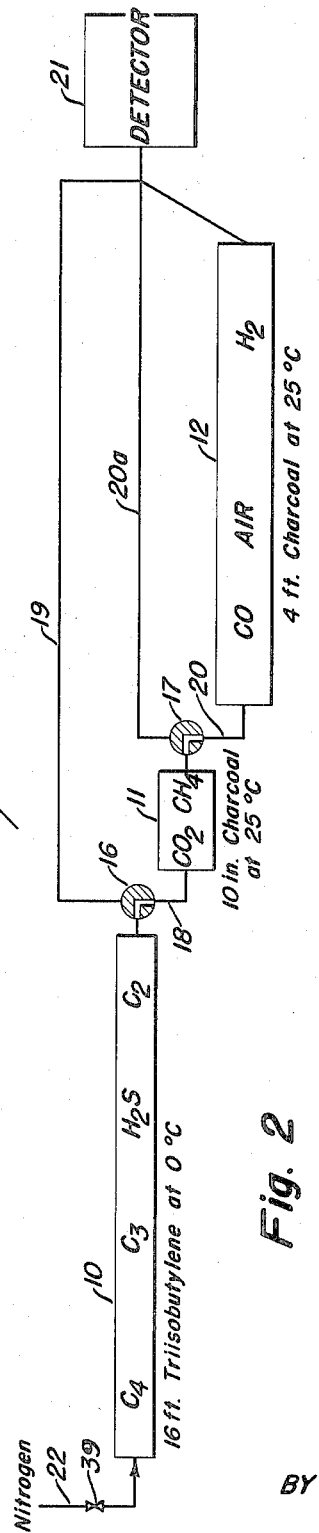
FIGURE 2 illustrates the separation of a mixture employing the apparatus of FIGURE 1.

An example of a separation for which this apparatus has been found useful is the separation of a mixture of $C_1$, $C_2$, $C_3$, $C_4$ hydrocarbons, hydrogen sulfide, carbon monoxide, carbon dioxide, air, and hydrogen. Three columns 10, 11 and 12 as shown in FIGURE 2, were used. Column 10 is a 16 ft. long, 4 mm. inside diameter column with triisobutylene as the stationary liquid, operated at 0° C.; column 11 is a 10 inch long, 4 mm. inside diameter column of activated charcoal, operated at 25° C.; and column 12 is a 4 ft. long, 4 mm. inside diameter column of activated charcoal, operated at 25° C.

Figure 3:
FIGURE 3 is a typical chromatogram obtained by using my apparatus.

A gas sample containing the above components is charged to the triisobutylene column 10 and nitrogen eluting gas is supplied by line 22 at 20 ml./min. All three columns 10, 11 and 12 are connected in series until the components have separated and oriented themselves as shown in FIGURE 2. At that time both charcoal columns 11 and 12 are bypassed, leaving the components in the positions they occupy, to be removed at a later time. The components from each of the columns is then blown out in order from triisobutylene column 10, 10 inch charcoal column 11, and 4 ft. charcoal column 12, producing the chromatogram shown in FIGURE 3.

Without this sequence of eluting the columns, three separate analyses would be required, using the three columns shown to obtain the separation of components as they are shown in FIGURE 2. Two lengths of charcoal column 11 and 12 are used because 4 ft. is necessary to separate hydrogen, air, and carbon monoxide but only 10 inches is required for carbon dioxide and methane.

If carbon dioxide were put through the 4 ft. charcoal column 12, its peak would be very flat and the time required to remove carbon dioxide would be about 50 minutes compared to 10 minutes with the shorter column 11. The $C_2$, $C_3$, and $C_4$ hydrocarbons would require several hours to remove them from only 10 inches of charcoal and the peaks would be so flat that quantitative results would be impossible.

This scheme is not restricted to analysis of gaseous samples. Another example is the separation of 2,3-dimethylbutane and 2-methylpentane in the presence of other hydrocarbons. These two hexanes can be separated from other hexane isomers on a 4 ft. long dinonyl phthalate column at 80° C. but they are not separated from each other. By passing only these two components out of the dinonyl phthalate column and into a column using a modified adsorbent, such as 1.5% squalene on Pelletex, they can be separated without unduly lengthening the time of analysis. Other examples are very numerous and this general scheme can find wide application.

A further application of this apparatus will be preparation of pure materials by trapping out desired components after separation by passing them into a "trap" such as a tube (not shown) filled with an adsorbent and chilled below ambient temperature.

Figure 4:
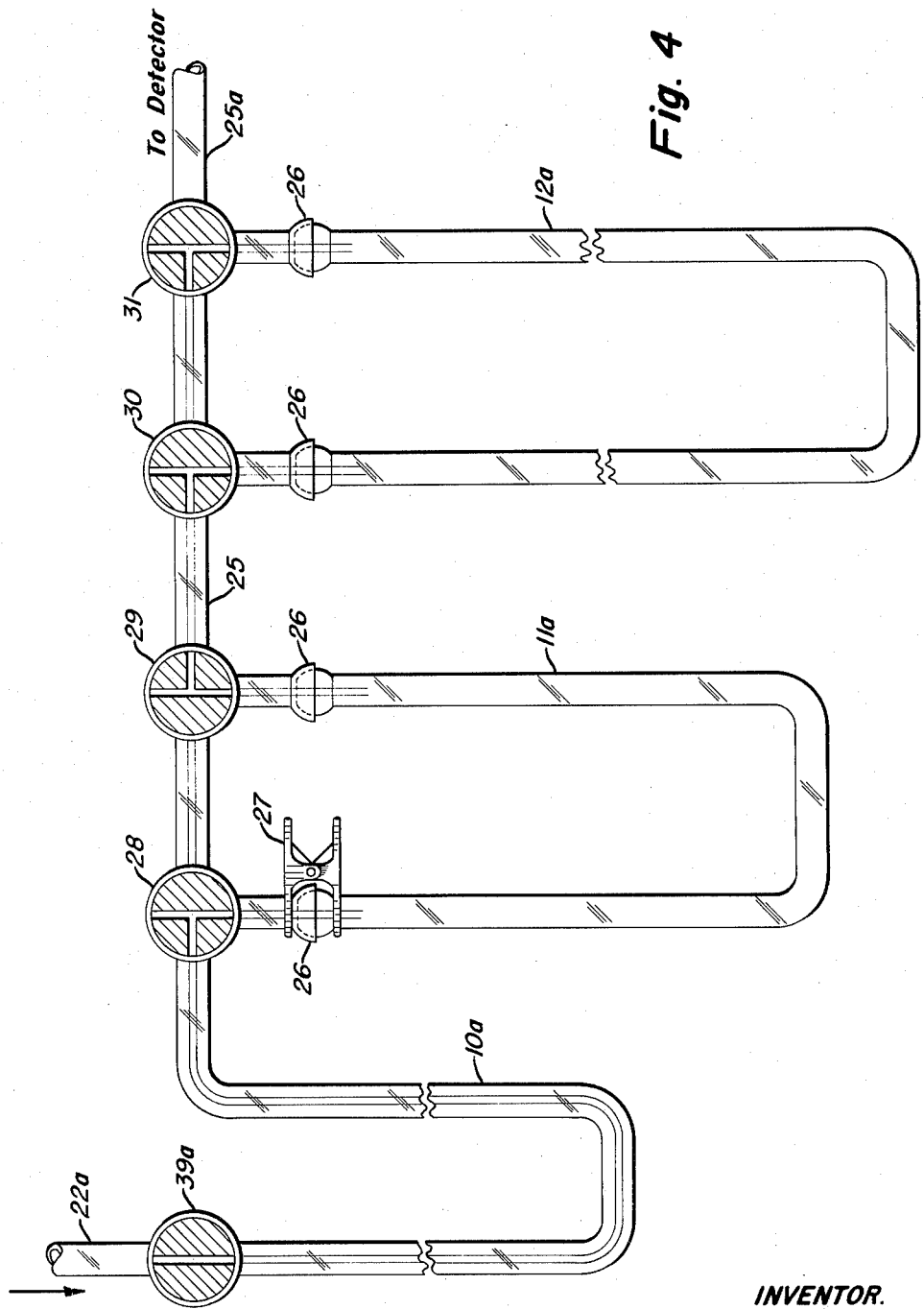

FIGURE 4 illustrates a manifold to be used with my multiple column gas chromatography apparatus. In this embodiment of the invention, eluting gas from the first column 10a is passed into either or both of the columns 11a and 12a or it may bypass either of columns 11a or 12a and flow to the detector 21 (not shown in FIGURE 4) via line 25a. The columns 11a and 12a are connected to the manifold 25 by means of ground glass ball joints 26 which may be secured by clamps 27. The stop cocks 28, 29, 30 and 31 are shown as T-bore three-way stop cocks and are turned so that the eluting gas passes through both U-type columns 11a and 12a.

FIGURE 5 represents another embodiment of the invention wherein the eluting gas from the first column 10b may be passed into either or both of the U-type columns 11b or 12b from which it may go to the detector 20 (not shown in FIGURE 5) via stop cocks 32 and 33, not entering the transfer line 37. The scheme shown in FIGURE 5 is useful to decrease the length of transfer line from the first column 10b to the detector 21 and when the first column 10b and the detector 21 are maintained at a higher temperature than subsequent columns 11b and 12b. It is contemplated, of course, that the number of U-type columns can be increased to three, four or more.

All of the stop cocks should be of capillary bore either 1 mm. or 2 mm. internal diameter. For low flow rates, such as 20 ml./min., 1 mm. is preferred; for faster flow rates, such as 50 ml./min., 2 mm. may be used. In general, the stop cocks in both of the embodiments illustrated by FIGURES 4 and 5 should be as near together as possible, which typically may be about 1.5 inches on center to center of the stop cocks. Instead of the T-bore three-way stop cocks, parallel oblique bore three-way stop cocks may be used. In the case of stop cock 32, I proposed to use a four-way stop cock for the modification illustrated which permits the bypassing of column 11b and/or column 12b. The manifold lines 25, 37 and 38 are preferably 1 mm. glass tubing.

The manifolds illustrated by FIGURES 4 and 5 are typical of the compact arrangements which may be used and, as pointed out above, will permit temperature differentials maintained between columns and between columns and detector as may be desired.

This improved apparatus can find use in nearly every laboratory which employs vapor-phase or gas chromatography. Chromatography apparatus heretofore available have provision for using only one column at a time. However, by my improved apparatus multiple columns can be incorporated into existing units to increase the flexibility and usefulness of any new or modified unit.

Although the invention has been described with reference to a preferred embodiment thereof, it is to be understood that this is by way of illustration only. Accordingly, it is contemplated that modifications and variations can be made in the apparatus by those skilled in the art in light of the preceding description without departing from the spirit of the invention.

What I claim is:

1. In a gas chromatography apparatus, the improvement whereby mixtures having components which are separable by elution-partition chromatography but not by elution-adsorption chromatography together with components which are separable by elution-adsorption chromatography but not by elution-partition chromatography may be resolved, comprising: an elution-partition column; an elution-adsorption column downstream of said elution-partition column; a valved conduit communicating between said elution-partition column and said elution-adsorption column; a detector communicating downstream of said elution-adsorption column; and a bypass around said elution-adsorption column and communicating with said valved conduit and said detector, whereby components resolved by said elution-partition column may be passed directly to the detector for detection and components not resolved by said elution-partition column may be passed to the elution-adsorption column for resolution and thereafter to the detector for detection.

2. Apparatus of claim 1 including a second elution-adsorption column intermediate the aforesaid elution-adsorption column and said detector; a second valved conduit communicating between said aforesaid elution-adsorption column and said second elution-adsorption column; and a second bypass around said second elution-adsorption column communicating with said second valved conduit and said detector, whereby components resolved by the aforesaid elution-adsorption column may be passed to the detector, and components not resolved by either said elution-partition column and the aforesaid elution-adsorption column may be passed through said second elution-adsorption column for resolution and thereafter to the detector for detection.

3. Apparatus for chromatographic analysis of a multi-component vapor sample which comprises first column means containing material for separating the more highly retentious components from said multi-component vapor sample; conduit means for introducing multi-component sample vapor and carrier gas into said first column means; second column means containing material for separating the less retentious components from said multi-component vapor sample not separable with measurable resolution in said first column means; measuring cell means; conduit means communicating between the outlet of said first column means and both the inlet of said second column means and said measuring cell means, said conduit means including valve means for alternately directing, at predetermined intervals, flow from said outlet of said first column means to said measuring cell and to said inlet of said second column means; and conduit means communicating between the outlet of said second column means and said measuring cell whereby successive specific components of said sample are supplied to the measuring cell first from the first column means and then from the series combination of the first and second column means.

References Cited by the Examiner

UNITED STATES PATENTS 2,398,818 4/1946 Turner _____ 73—23
2,868,011 1/1959 Coggeshall _____ 73—23

OTHER REFERENCES

Gas Chromatography II, N. H. Ray in J. Applied Chemistry, vol. 4, February 1954, pages 82–85, copy in 73–23C.

Chemistry and Engineering News, April 9, 1956, "Gas Chromatography Growing," copy in Div. 36, pages 1692–1696.

Oil and Gas Journal, April 16, 1956, "Analyzing Hydrocarbon Mixtures," by Podbielniak and Preston, pages 211–217, copy in Div. 36.

RICHARD C. QUEISSER, Primary Examiner.

AUDREY McFAYDEN, CHARLES A. CUTTING, ROBERT EVANS, Examiners.